United States Patent [19]

Frode

[11] 3,893,138
[45] July 1, 1975

[54] ACCESSORY SOCKET FOR INTERCHANGEABLE LENS FOR PHOTOGRAPHIC CAMERAS

[75] Inventor: Ralf Sture Frode, Pixbo, Sweden

[73] Assignee: Fritz Victor Hasselblad, Goteborg, Sweden

[22] Filed: Aug. 13, 1973

[21] Appl. No.: 387,633

[30] Foreign Application Priority Data
Aug. 28, 1972 Sweden.............................. 11126/72

[52] U.S. Cl. ................. 354/286; 350/252; 354/295
[51] Int. Cl. ........................................... G03b 17/56
[58] Field of Search ............ 95/44 R; 354/295, 296, 354/286; 352/252, 257

[56] References Cited
UNITED STATES PATENTS

| | | | |
|---|---|---|---|
| 1,688,370 | 10/1928 | Wittel | 354/295 X |
| 2,926,577 | 3/1960 | Albrecht | 95/44 R |
| 3,067,664 | 12/1962 | Winslow | 95/44 R |
| 3,266,396 | 8/1966 | Padelt | 95/44 R |
| 3,472,140 | 10/1969 | Moffitt | 354/295 X |
| 3,747,490 | 7/1973 | Brandt | 95/44 R |
| 3,766,841 | 10/1973 | Finnegan et al. | 95/64 R |

*Primary Examiner*—Samuel S. Matthews
*Assistant Examiner*—E. M. O'Connor
*Attorney, Agent, or Firm*—Sherman and Shalloway

[57] ABSTRACT

An accessory mount for associating accessories with interchangeable lenses including a mount for incorporation in the lens assembly and having an aperture coaxial with the lens axis with the mount having a surface extended laterally outwardly from the lens barrel to engage and support the accessories.

6 Claims, 3 Drawing Figures

– 3,893,138 –

ACCESSORY SOCKET FOR INTERCHANGEABLE LENS FOR PHOTOGRAPHIC CAMERAS

BACKGROUND OF THE INVENTION

This invention relates to interchangeable lenses for photographic cameras and is concerned, more particularly, with an accessory mount on such lenses for securing accessories such as an automatic exposure control unit on the side of such lenses to engage and regulate the adjusting mechanisms of the lenses such as the diaphragm or shutter-speed controls thereof.

BRIEF DESCRIPTION OF THE PRIOR ART

Presently, interchangeable lenses having diaphragms and between-lens shutters are provided, at their forward portion, with accessory mounts for filters, supplementary lenses, shades, and the like. These mounts currently include internal and/or external bayonet-fittings or screw threads.

However, when this type of accessory mount is used to secure a control unit for controlling the shutter-speed or diaphragm rings of the lens, such as by driving the toothed or serrated sectors on the outer surface of the rings — typically an automatic exposure unit — several disadvantages are encountered.

One such problem is the location of the accessory mount, and its accessory, at such a great distance from the rings which are to be controlled thereby, that springiness or torsional distortion of the intermediate drive member may be encountered. This results in unreliable, non-uniform engagement between the drive member and the control rings, and a consequent inaccuracy in the setting of the lens components which are to be adjusted.

Also, there is a specific problem between different lenses, since the distance between the control-rings and the forward end of the lens assembly varies from one lens to another. This requires a whole series of individual adapter-elements to accommodate the various dimensional differences.

Further, such accessory mounts are relatively delicate and easily deformed or damaged by accidental bumps or impacts.

Finally, such mounts actually limit the versatility of the lens, when a control unit or primary accessory is mounted thereon, since the mount is occupied by the control unit, thereby making it impossible to install a desired or necessary auxiliary unit such as a filter or a lens shade.

SUMMARY OF THE INVENTION

In general, the preferred form of the present invention comprises an accessory mount plate incorporated in a lens body between the control rings and the forward end of the lens body. The mount plate is spaced from the control rings by a spacer ring which fixes the distance therebetween and provides rigidity of the assembled unit.

Internally, the mount plate has an aperture coaxial with the axis of the lens system, while the portion thereof which is external of the lens body may take any shape desired.

The mount plate, spacer ring, and control rings have aligned, longitudinal bores which are aligned with threaded apertures in the forward lens frame. The components are secured as a unit by longitudinal screws passed through the longitudinal bores and threaded into the threaded apertures.

A bayonet ring is secured to the forward side of the mount plate to carry supplemental accessories such as filters and lens shades.

OBJECTS OF THE INVENTION

It is an object of the present invention to provide an accessory mount for lenses which is simple in construction, stable, and rugged in service.

A further object of the invention is to provide an accessory mount for lenses which may be employed with a wide variety of lenses.

A still further object of the invention is to provide an accessory mount for lenses which will secure an automatic control unit thereon without excessive play between the control unit and the control rings of the lens.

It is a further object of the invention to provide an accessory mount for lenses which permits the mounting and use of other accessories in addition to and simultaneously with a first accessory such as an automatic control unit.

BRIEF DESCRIPTION OF THE DRAWINGS

The foregoing and other objects of the mention will be more clearly understood from the following description and accompanying drawings, in which.

Figure 1:
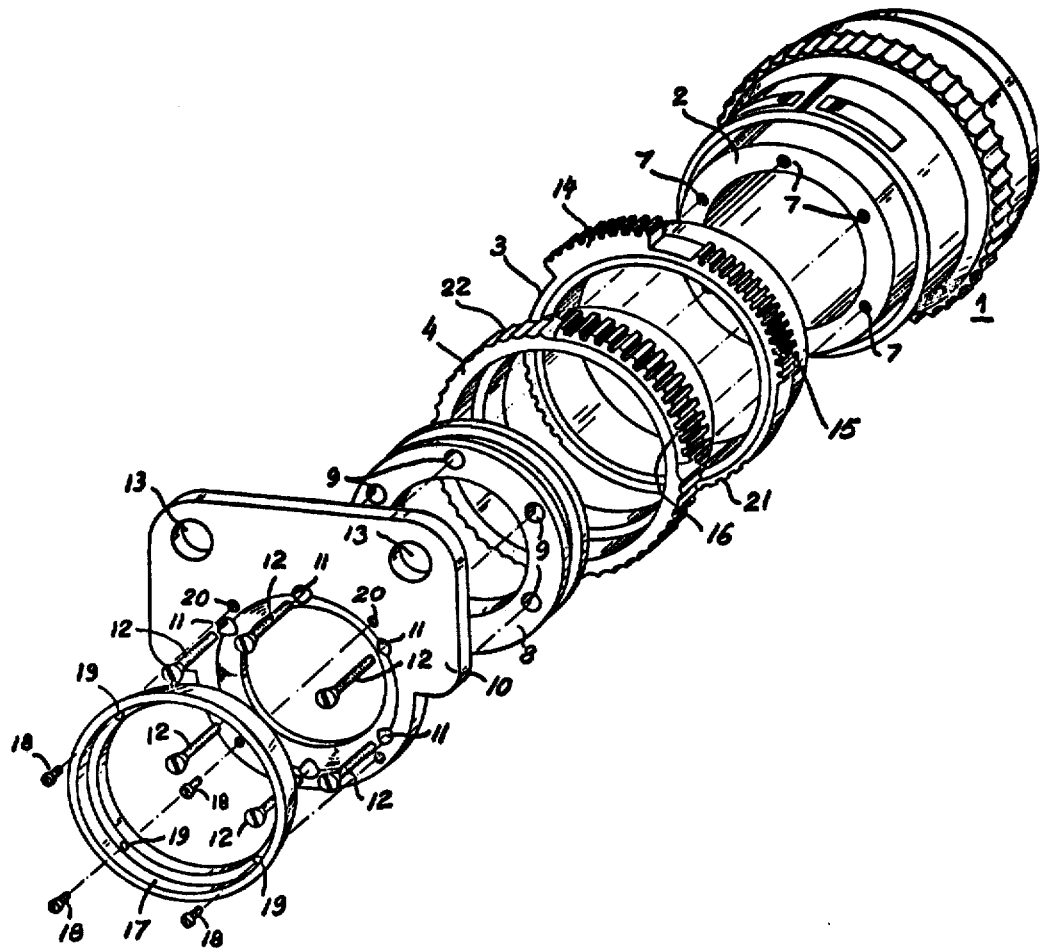
FIG. 1 is an exploded, perspective view of an interchangeable lens embodying the invention.

In the drawings, certain elements of the lens assemblies, which are not of direct concern to the present invention, have been omitted for the sake of clarity.

DESCRIPTION OF THE PREFERRED EMBODIMENT

As shown in the drawings, interchangeable lenses include a base portion 1 having a mounting surface or plate 2 on the forward portion thereof.

Figure 3:
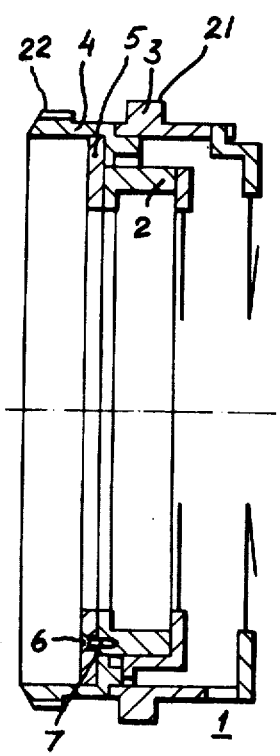
FIG. 3 is a view of a conventional lens, similar to the view of FIG. 2, and intended for comparison therewith.

For purposes of comparison, FIG. 3 shows a conventional assembly of a diaphragm control ring 3' and a speed control ring 4' mounted on an interchangeable base portion 1' by an assembly or lock ring 5' which is secured to the base mount 2' by screws 6' which engage threaded holes 7' in the base 1'.

Figure 2:
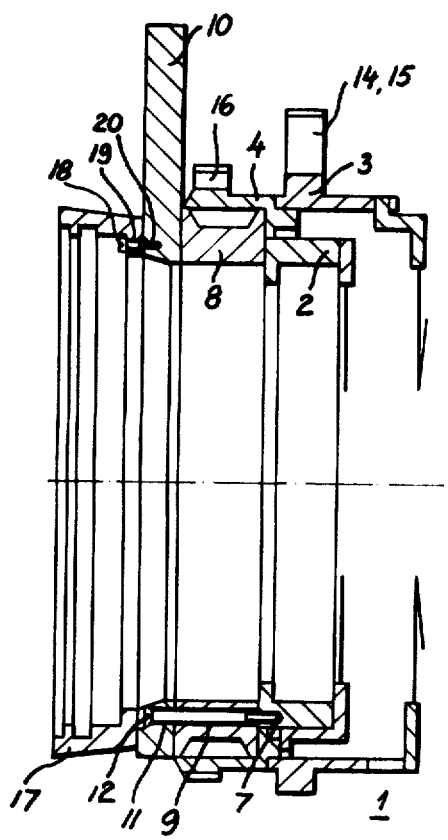
FIG. 2 is a longitudinal and vertical, sectional view of the lens of FIG. 1.

When a lens of the conventional type shown in FIG. 3 is to be equipped with an accessory mount in accordance with the present invention, as shown in FIGS. 1 and 2, a spacer ring 8 is used to replace the backing ring 5 of FIG. 3.

The spacer ring 8 includes clearance holes or bores 9, which are aligned with the holes 7 in the mount surface 2.

At its end remote from the mount surface 2, the spacer ring 8 abuts an accessory mounting plate 10, which includes an aperture 10a aligned with the optical axis of the lens. The accessory mounting plate has bores 11 which are aligned with the bores 9 of the spacer ring 8.

The assembly of the accessory mounting plate 10, the spacer ring 8 and control rings 4 and 3 is secured to the mounting surface 2 by means of a plurality of through bolts 12. The bolts turn freely in the bores 11 and 9 and are threaded into the threaded holes 7 in the mount surface 2 of the lens base 1.

In this mounting, the spacer ring acts as an axial lock for the control rings 4 and 3, as well as providing a longitudinal abutment for the inner, ring shaped portion of the accessory mounting plate 10. Therefore, the clearance distance between the accessory mount 10 and the rings is fixed by the spacer ring 8.

The lateral portion 10b of the accessory mounting plate, which is external of the lens body, carries two mounting holes 13 and is generally rectangular, in the embodiment shown, to mount and automatic control unit. It is to be understood, however, that the lateral or external portion of the accessory mounting plate 10 may take any desired shaped and may be designed to fit any specific accessory.

The accessory mounting plate 10, carries an auxiliary mount such as a bayonet ring 17 mounted thereon by means of screws 18 which extend through bores 19 in the ring 17 and which are secured in threaded holes in the mount plate 10.

As shown in FIGS. 1 and 2, the diaphragm ring 3 and the speed ring 4 are provided with external toothed or gear gear sections 14 and 15, respectively, in addition to conventional grips 21 and 22, respectively.

However, the specific provision of the gear sectors 14 and 15 does not come within the scope of the present invention. While such gear sectors may be of advantage with certain accessories, the advantages thereof are not predicated on the present invention and the present invention is not limited thereto.

Also, the present invention is not concerned with or dependent upon the exact type or design of speed or diaphragm control rings; their interaction or complying with regard to each other, or any specific feature of such control rings.

Various changes may be made in the details of the invention as disclosed, without sacrificing the advantages thereof or departing from the scope of the appended claims.

What is claimed is:

1. An interchangeable lens including an accessory mount for supporting accessories laterally on said lens, said lens having at least one adjusting mechanism, said mount comprising a plate having
an aperture therein,
means for mounting said plate on said lens forward of the adjusting mechanisms thereof and with said aperture aligned with the optical axis of the lens, said plate having
a lateral portion positioned adjacent the lens body,
and positioning means for fixing the position of said mounting plate relative to said adjusting mechanism.

2. The lens and accessory mount of claim 1 in which said positioning means includes a spacer ring positioned between said mount plate and said adjusting mechanism.

3. The lens and accessory mount of claim 2 in which said adjusting mechanism includes a control ring and said spacer ring is positioned at least partially within said control ring.

4. The lens and accessory mount of claim 3 in which said positioning means includes threaded members extended longitudinally through said mount plate, said spacer ring, and said adjusting mechanism and threaded into a structural portion of said lens.

5. The lens and accessory mount of claim 1 including an auxiliary mount for accessories secured on said mount plate.

6. The lens and accessory mount of claim 5 in which said auxiliary mount is a bayonet ring.

* * * * *